United States Patent
Pernestål

(10) Patent No.: US 8,800,387 B2
(45) Date of Patent: Aug. 12, 2014

(54) METHOD AND SYSTEM FOR EVALUATING A PLAY

(75) Inventor: Kjell Pernestål, Uppsala (SE)

(73) Assignee: TIAP AB, Uppsala (SE)

( * ) Notice: Subject to any disclaimer, the term of this patent is extended or adjusted under 35 U.S.C. 154(b) by 335 days.

(21) Appl. No.: 13/321,376

(22) PCT Filed: May 19, 2010

(86) PCT No.: PCT/SE2010/050545
§ 371 (c)(1),
(2), (4) Date: Nov. 18, 2011

(87) PCT Pub. No.: WO2010/134884
PCT Pub. Date: Nov. 25, 2010

(65) Prior Publication Data
US 2012/0067139 A1   Mar. 22, 2012

(30) Foreign Application Priority Data

May 20, 2009 (SE) ...................................... 0900686

(51) Int. Cl.
*G01L 5/24* (2006.01)
*G01L 3/02* (2006.01)

(52) U.S. Cl.
USPC ................. 73/862.21; 73/862.23; 73/862.28; 73/862.191

(58) Field of Classification Search
USPC .......... 73/761, 862.23, 862.21, 862.321, 847, 73/862.08, 862.191
See application file for complete search history.

(56) References Cited

U.S. PATENT DOCUMENTS 4,559,448 A   12/1985 Rozsa
(Continued)

FOREIGN PATENT DOCUMENTS

DE   28 01 986 A1   1/1978
(Continued)

*Primary Examiner* — Lisa Caputo
*Assistant Examiner* — Jonathan Dunlap
(74) *Attorney, Agent, or Firm* — Foley & Lardner LLP

(57) ABSTRACT

The invention relates to a method of evaluating the play between two threaded components, a first component comprising an internal thread, and a second component comprising an external thread that corresponds to the internal thread of the first component, the components are engaged with each other the method comprising the steps of: applying a torque from a motor to said components such that a first side of the internal thread is in contact with an opposing first side of the external thread wherein the two components are mutually rotated, which mutual rotation yields a mutual translation movement of the two threaded components; fixing the components with respect to each other, such that no mutual translation movement is allowed, whereas mutual rotation is still allowed; withholding the applied torque to one of said components, until a second side of the internal thread is in contact with an opposing second side of the external thread, monitoring the applied torque during the above steps by determining the power input to the motor and the rotational speed of the motor in order to identify a first point in time when the first side of the internal tread loses contact with the opposing first side of the external tread and a second point in time when the second side of the internal tread meets the opposing second side of external tread, calculating from the identification of the first and second points in time a play (a) between the internal tread and the external tread evaluating the play (a) by comparing the play (a) with a reference play. The invention further relates to an evaluation system for evaluating the play between the two threaded components.

16 Claims, 4 Drawing Sheets

(56) References Cited

U.S. PATENT DOCUMENTS

| | | | |
|---|---|---|---|
| 4,633,702 A * | 1/1987 | Kaiser et al. | 73/9 |
| 4,709,182 A * | 11/1987 | Wenske et al. | 310/316.01 |
| 4,845,998 A * | 7/1989 | DeMartelaere et al. | 73/862.23 |
| 5,493,913 A * | 2/1996 | Layer et al. | 73/761 |
| 5,637,806 A * | 6/1997 | Baryshnikov et al. | 73/862.21 |
| 5,837,907 A * | 11/1998 | Ohmi et al. | 73/862.23 |
| 5,999,583 A | 12/1999 | Pysnik et al. | |
| 6,978,846 B2 * | 12/2005 | Kawai et al. | 173/2 |
| 7,091,683 B1 * | 8/2006 | Smith et al. | 318/432 |
| 7,464,769 B2 * | 12/2008 | Nakazawa et al. | 173/176 |
| 7,588,098 B2 * | 9/2009 | Nakazawa et al. | 173/176 |
| 7,665,366 B2 * | 2/2010 | Akita | 73/761 |
| 7,823,465 B2 * | 11/2010 | Makimae et al. | 73/862.23 |
| 7,966,888 B2 * | 6/2011 | Akita | 73/761 |

FOREIGN PATENT DOCUMENTS

| | | |
|---|---|---|
| JP | 2004-144604 A | 5/2004 |
| SE | 465 896 B | 11/1991 |
| SE | 469 095 B | 5/1993 |

* cited by examiner

METHOD AND SYSTEM FOR EVALUATING A PLAY

FIELD OF THE INVENTION

The present invention relates to a method of evaluation and an evaluation system for evaluating a play between two components according to the preambles of the independent claims.

BACKGROUND OF THE INVENTION

A nuclear reactor converts nuclear energy into heat due to radiation of particles and photons. When fissile uranium isotopes absorb neutrons they will split, the fission process, and there is a subsequent release of energy, of fission fragments and of two or more neutrons. These released neutrons can then hit other uranium nuclei causing them to fission and there is a chain reaction going on. The control of the chain reaction is maintained by means of geometric and physical factors such as temperature and presence of moderators and neutron absorbing nuclei. The control rods are a part of this neutron flux control system and are used to regulate the rate of the nuclear chain reaction, by being inserted into or withdrawn out of the core in between the fuel rods or fuel assemblies in the reactor core. The control rods contain material such as cadmium and boron which nuclear structure absorb neutrons.

The neutron flux in the reactor core is carefully monitored and controlled. When the neutron flux decreases control rods are withdrawn out of the core, and fewer neutrons are absorbed and the fission rate increases. When the neutron flux in the core increases, the rods are inserted and the fission rate is decreased. To maintain a controlled nuclear chain reaction, the control rods are manipulated in conjunction with other means in such a way that there is equilibrium between released neutrons and absorbed neutron causing fission reactions.

If the neutron flux in the reactor core is outside predefined conditions the control rods can be inserted in purpose to inhibit the fission process and cause shutdown. This process takes typically only a few seconds. Hence, the control rods constitute a very important part of the nuclear reactor safety system.

If the control rod system or a part thereof for some reason would break down, the reactor or a part thereof becomes uncontrollable. It is therefore of great importance that the control rods and the arrangement to control the rods are inspected with certain time intervals.

The control rods are inserted or withdrawn from the reactor core by some mechanical device which, in its turn, is operated by hydraulic or electric motors etc. All these components are an integrated part of the core assembly and are mounted inside the pressure vessel enclosure of the reactor core and cannot be inspected when the reactor is in operation due to the hazardous radiological environment.

From the U.S. Pat. No. 5,999,583 it is known to analyse the control of the driving mechanism of the control rod by using coil current signals. The analysis is thus directed to a drive mechanism with grippers to engage the drive rod, and leaves analysis of other kinds of driving mechanisms unsolved.

From JP 2004 144604 a method is known to measure a play between a nut and a screw. A worm gear is used to ensure that the nut and screw is self-locking A position sensor is installed in relation to the worm gear and is used to determine changes in torque and the play. Thus, the method requires installation of a special sensor which can be difficult in inaccessible places.

The object of the present invention is to detect faultiness of a control rod and its driving mechanism in a nuclear power plant.

SUMMARY OF THE INVENTION

The above-mentioned object is achieved by a method of evaluating the play between two threaded components according to the first independent claim. According to a first aspect, the invention relates to a first component comprising an internal thread, and a second component comprising an external thread that corresponds to the internal thread of the first component, the components are engaged with each other. The method comprising the steps of:

applying a torque from a motor to the components such that a first side of the internal thread is in contact with an opposing first side of the external thread, wherein the two components are mutually rotated, which mutual rotation yields a mutual translational movement of the two threaded components;

fixing the components with respect to each other, such that no mutual translational movement is allowed, whereas mutual rotation is still allowed;

withholding a torque to said components, until a second side of the internal thread reaches contact with an opposing second side of the external thread, monitoring the applied torque during the above steps by determining the power input to the motor and the rotational speed of the motor in order to identify a first point in time $t_1$ when the first side of the internal tread loses contact with the opposing first side of the external tread and a second point in time $t_2$ when the second side of the internal tread meets the opposing second side of external tread, calculating from the identification of the first and second points in time a play (a) between the internal tread and the external tread;

evaluating the play (a) by comparing the play (a) with a reference play.

The invention further comprises an evaluation system for evaluating the play between two threaded components, a first component comprising an internal thread, and a second component comprising an external thread that corresponds to the internal thread of the first component, the system comprises a control unit adapted to send control signals to a motor applying a torque to the components, such that the components are first fixated with respect to each other, such that no mutual translational movement is allowed, and a first side of the internal thread is in contact with an opposing first side of the external thread wherein the two components are mutually rotated, which mutual rotation yields a mutual translation movement of the two threaded components;

a torque is withheld to said components, until a second side of the internal thread reaches contact with an opposing second side of the external thread; the evaluation system further comprises an evaluation unit adapted to monitor said torque applied to at least one of the components, said monitoring comprises determining the power input to the motor and the rotational speed of the motor, and a processing unit for processing means, wherein the evaluation unit further is adapted to:

from the monitored torque, identify a first point in time $t_1$ when the first side of the internal tread loses contact with the opposing first side of the external tread and a second point in time $t_2$ when the second side of the internal tread meets the opposing second side of external tread;

calculate from the identification of the first and second points in time a play (a) between the internal tread and the external tread; and to evaluate the play (a) by comparing the calculated play (a) with a reference play.

The invention describes a method and a system to determine the readiness of operation of the control rods when the control rod assembly is mounted in its operating position or during reactor operation. Thus, there is no need for approaching the assembly or access its neighbourhood.

In a boiling water reactor (BWR) a control rod is typically inserted from below the nuclear core making use of a hydraulic piston or a screw mechanism which is operated by an electric motor. The electric motor drive is mounted outside the pressure vessel but the torque, delivered by the motor, is transferred via a tightening to a screw positioned inside the vessel. When rotated, a nut which is not allowed to rotate, positioned on a screw, will change its position and the control rod, connected to the rod by means of tube shaped piston will move the control rod into or out of the reactor core.

By measuring the play between threaded components, i.e. the nut and the screw, it is possible to determine if the play is within acceptable limits and thus indicating a healthy screw mechanism. Prior to service, a control rod assembly can be tested by using the described method before dismounting and the state of the device can be given. Hence it is possible to prepare the work before the service process is initiated. If no error is found in the test, the assembly can be left unopened. This is an advantage, not only because of time saving but also as the process of opening the assembly is a risk for creating new errors due to erroneous mounting, use of erroneous parts etc. irrespective if the assembly was free from errors when opened.

Also, as the torque is monitored by studying both the supplied power to the motor and the rotational speed of the motor, there is no need to arrange additional sensors and/or cables adjacent to the components to be evaluated. Further, if there are several sources of plays in the power transfer line it is, by means of the invention, possible to identify these plays and their magnitude separately. In this way, plays in couplings, gear wheels etc. may be identified and determined separately. It is also possible to identify play in the bearings which fixate the screw and/or nut.

According to one embodiment, the method further comprises the step of monitoring the rotational movement of the two threaded components, wherein the play (a) is calculated from the comparison of the torque and the rotational movement of the components over time. Thus, a play (a) between the components can be determined by determining a rotational movement of the components over the same time as the torque is monitored.

According to another embodiment, the rotational movement is determined by measuring an angle rotation between the components by means of an angle rotation sensor. Thus, an alternative way of determine the relative movement between the components is obtained.

According to a further embodiment, the play (a) is determined by calculating a rotation angle $f_i$ being the obtained rotational difference between the first point in time and the second point of time, whereby the play (a) is determined by calculating $a=f_i/360 \cdot G$, where (G) is the pitch of the threads of the components. Thus, a play (a) may be calculated that relies on a measured relative movement between the first and second components.

According to a still further embodiment, the step of monitoring the torque comprises measuring the torque by a torque sensor. Thus, a straight-forward way of monitoring the torque is achieved. In another embodiment, the step of monitoring the torque comprises measuring a motor current I and a motor voltage U of a motor applying said torque, and deriving an angular frequency $\omega$ and the torque from the measured signals. According to a further embodiment, the step of monitoring the torque comprises measuring a motor current I, a motor voltage U and an angular frequency $\omega$ from a motor applying the torque. Thus, other ways of determining the torque are achieved, which may use signals already present in the motor arrangement as sensed signals.

According to one embodiment, the evaluation unit is adapted to monitor the rotational movement of the two threaded components, to compare the torque and the rotational movement of the components over time, and calculate the play (a) from the comparison. Thus, by relating the rotational movement with the torque in time, the relative movement between the first and second components can be determined and accordingly the play (a).

According to one embodiment, the evaluation unit is adapted to determine the rotational movement from the rotational speed of a motor generating the applied torque. Thus, if the rotational speed of a motor applying said torque is known, then the play (a) may be directly withdrawn from the monitored torque.

According to another embodiment, the system comprises an angle rotation sensor for measuring a rotational movement between the components. Thus, an alternative way to determine the relative movement between the first and second components is shown.

According to a still further embodiment, the evaluation unit is adapted to determining a rotation angle $f_i$ being the obtained rotational difference between said first point in time and said second point of time, and the play (a) by calculating $a=f_i/360 \cdot G$, where G is the pitch of the threads of said components. Thus, an alternative way of determining the play between the first and second components is shown.

According to one embodiment, the system comprises a torque sensor for measuring the torque applied by a motor. Thus, the torque may be easily obtained by direct measuring. According to another embodiment, the system comprises sensors for measuring a motor current I and a motor voltage U of a motor applying the torque, whereby the evaluation unit is adapted to derive an angular frequency $\omega$ and the torque from the measured signals.

According to another embodiment, the system comprises sensors for measuring a motor current I, a motor voltage U and an angular frequency $\omega$ of a motor applying said torque, whereby the monitoring means is adapted to calculate a torque from sensed signals. Thus, the torque may be obtained by indirect measuring.

Preferably, the components are a screw and nut in a control rod assembly. Thus, the play of the components can be determined to evaluate the function of the control rod.

The invention also relates to a computer program product comprising computer program code means adapted to perform the steps of the method of evaluating the play between two threaded components, when running on a processor associated with the evaluation system.

According to a further aspect, the invention relates to a computer program product with computer program code means for performing the method steps according to the invention, where the computer program code means is stored on a computer readable medium. Thus, the program for performing the method may be stored on a CD-ROM, a USB-memory or any other kind of computer readable medium, or may be transferred wirelessly, by optical fibre or cable or by any other kind of transmission means to the system.

Preferred embodiments are set forth in the dependent claims and in the detailed description.

SHORT DESCRIPTION OF THE APPENDED DRAWINGS

Below the invention will be described with reference to the accompanying drawings, of which:

DETAILED DESCRIPTION OF PREFERRED EMBODIMENTS OF THE INVENTION

Figures 1, 2:
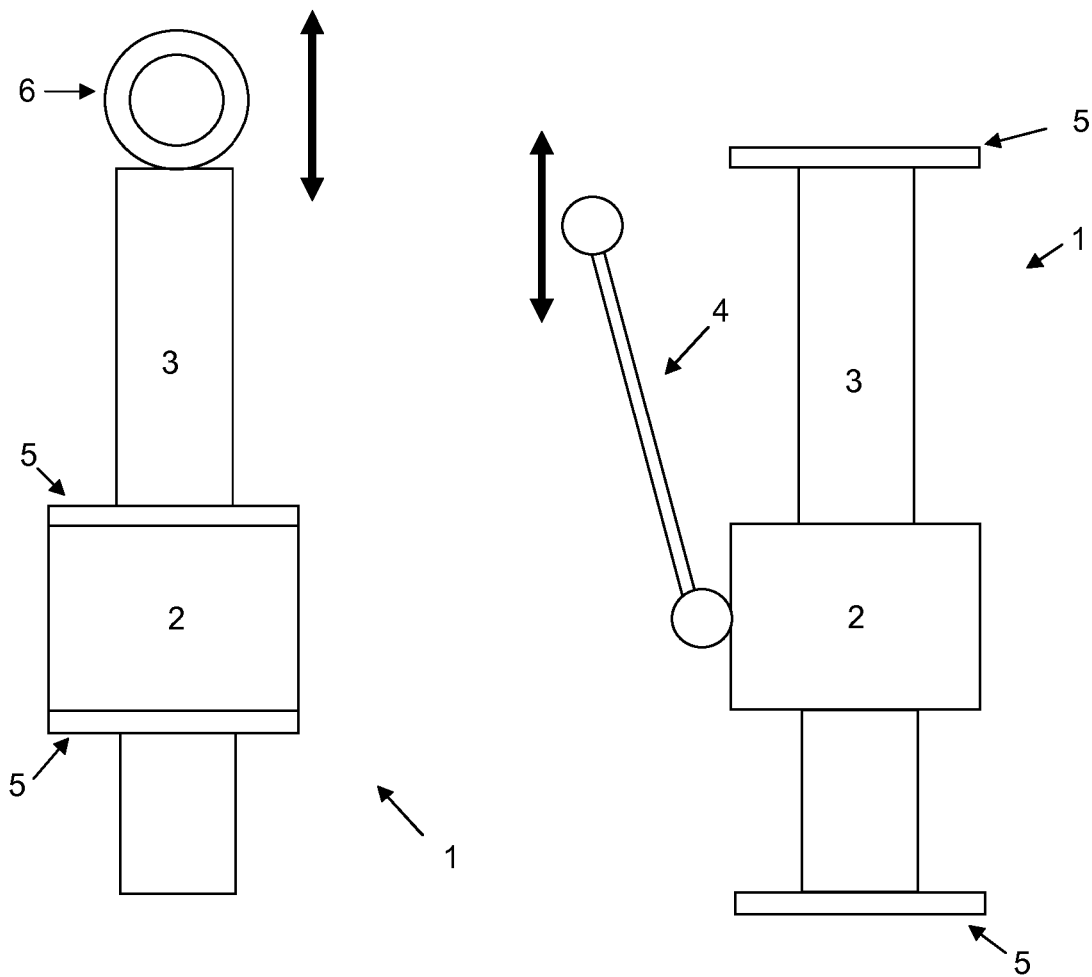
FIG. 1 illustrates a control rod assembly where the screw is moveable and the nut is fixated.
FIG. 2 illustrates a control rod assembly where the screw is fixated and the nut is moveable.

A control rod assembly 1 as shown in FIGS. 1 and 2 typically comprises an induction motor (not shown), a gear box (not shown), tightenings (not shown), screw 3 and nut 2 and bearings 5 of the screw 3 or nut 2. In FIG. 1, the load of the control rod, denoted schematically as 6 in the figure, rests on the screw 3. In FIG. 2, the load of the control rod, piston and hydraulic piston, denoted schematically as 4 in the figure, rests on the nut 2. Furthermore, there is a tightening in between the piston and the cylinder composing the hydraulic insertion mechanism (not shown). When the motor starts, it will collect the play in the joints, the gear box and the play in the nut 2. This can be seen as a sequence of short low sections in the current supply. If there is play in the nut 2, the load on the motor will increase as the power needed for moving the upper part of the control rod will increase. This load is composed of the friction in the piston tightening, the mass of the assembly and friction in the steering of the rod guiding the rod to the inner reactor core. When the control rod is moved out of the reactor core, the process is the reverse. Thus, in the control rod, the screw 3 and nut 2 are two components that are exposed to stress because of their load. As it is crucial for the function of the nuclear reactor that the two components 2, 3 works well, it is important to evaluate their function. To visually examine the wear is difficult in many applications, especially in nuclear control rod applications. The nut 2 has to be taken off the screw 3, which in practice demands an extensive demounting. Thus, a method for evaluating the components 2, 3 without having to demount them is desired.

A screw 3 and nut 2 is a well known method to transfer a rotation of axis the screw 3, to a translational movement, i.e. a nut 2 that travels on the axis of the screw 3. That means that a torque, for example from a driving motor or a crank, is transformed into a linear force. Also the reversed combination occurs. If the position of the nut 2 is fixated with appropriate bearings 5, such that nut 2 can rotate while the screw 3 is not allowed to rotate, the screw 3 will undertake the linear movement as illustrated in FIG. 1. Alternatively, the screw axis 3 can be fixated with bearings 5 such that the screw axis 3 can rotate, while the nut 2 is not allowed to rotate. Then the nut 2 will undertake the linear movement, as is illustrated in FIG. 2.

The invention may be used in a plurality of common applications such as lift jacks, different types of valves and draught valve, but also in applications as apparatuses for robot arms, control of controls for airplanes etc. In this application the invention is thus exemplified with reference to control rods in nuclear reactors.

Figure 3:
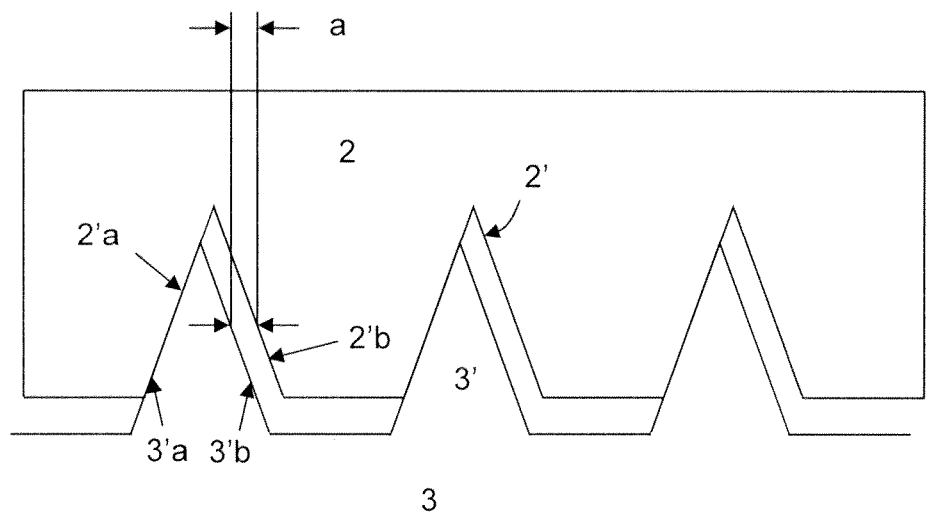
FIG. 3 illustrates a component consisting of two parts in threaded engagement, with a play (a) between the parts.
Figure 5:
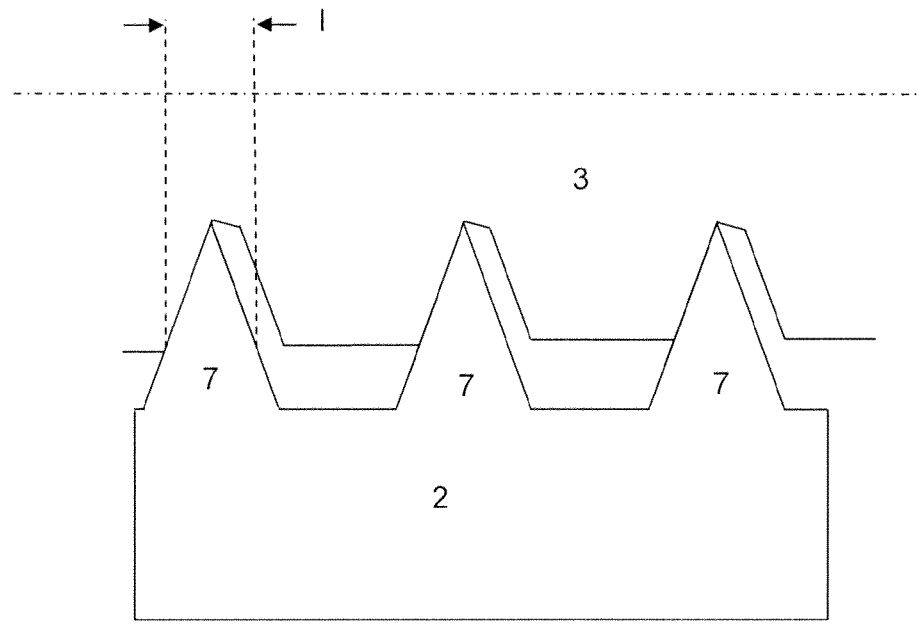
FIG. 5 shows a worn component.

The nut 2 slides on the rotating screw 3 which in turn results in wear and a play between the nut 2 and screw 3. In FIG. 3, the internal threads 2' of the nut correspond to the external threads 3' of the screw 3. The internal threads 2' have two inner sides, a first side 2'a and a second side 2'b. The external threads 3' have got two external sides, a first side 3'a and a second side 3'b. The play (a) may in itself convey problems as a backlash arises, and the nut 2 can change position along the screw 3 without transferring a motion the screw 3. Wear also conveys problem such that the nut 2 in itself gets a smaller contact area, as shown in FIG. 5, between the nut 2 and screw 3, and the "bottom" of the thread root 7 becomes smaller i.e. the shearing length (l) becomes smaller and therefore can take up less shearing forces, i.e. the strength of the threading becomes less. The wear and following play leads to that the nut 2 may wobble on the screw 3, i.e. the axis of the nut 2 and screw 3 do not coincide but both may run parallel and gain angle in respect of each other. The consequence of this is that the movement of the nut 2 is not simply proportional to the turning angle of the screw 3.

There is thus a plurality of reasons to measure the play (a) between the nut 2 and the screw 3 as an increased play entails:

Backlash which restrict the precision in the movement of the nut

Weakening of the capability of the screw to take load because the thread groove cannot take small shearing forces, and because the surface pressure between the nut and screw increases.

Lost linearity in the nut movement on the screw.

Figure 4:
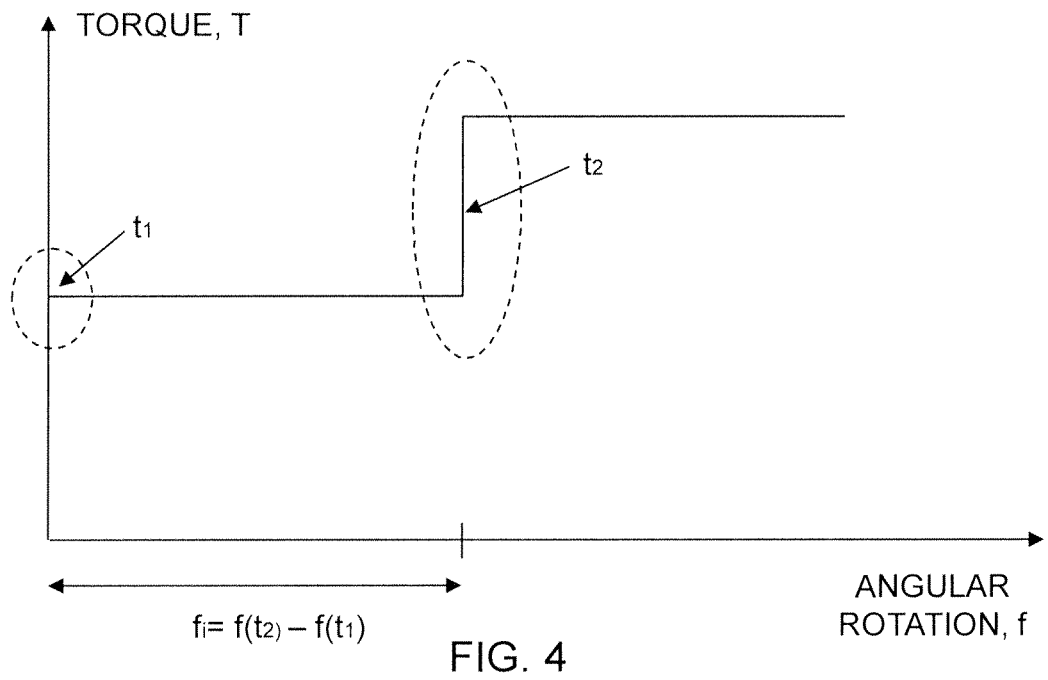
FIG. 4 shows a graph of the torque T and the turning angle $f_i$.
Figure 7:
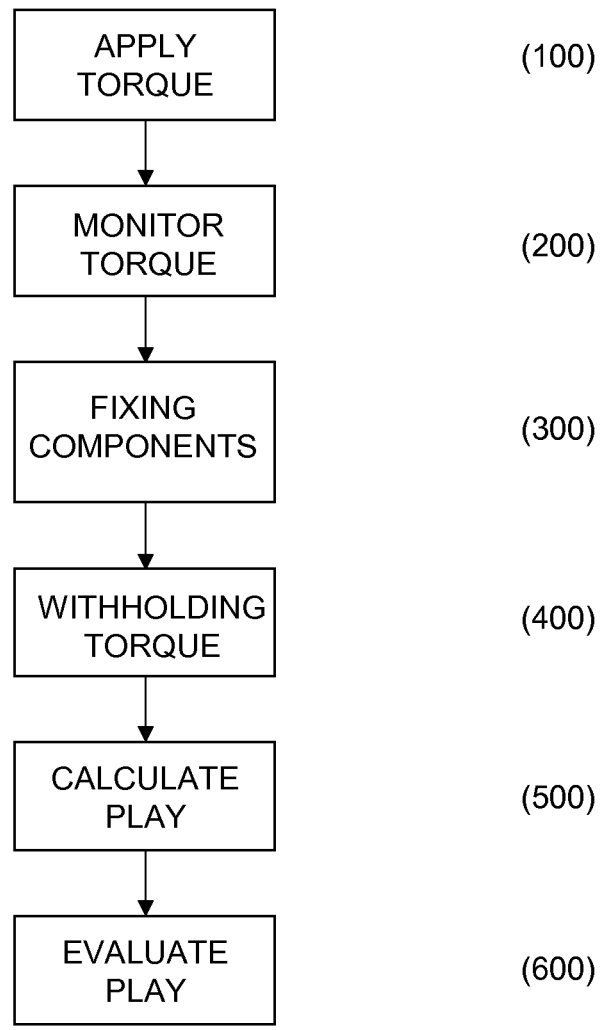
FIG. 7 shows a flow chart of one embodiment of the method according to the invention.

The invention is based on the fact hat it is possible to evaluate the condition of a control rod by evaluating the condition of a first and a second component 2, 3, i.e. the nut 2 and the screw 3, in the control rod assembly that is exposed to load stress and thus wear. According to the invention as illustrated in the flowchart of FIG. 7, a torque is applied to the components 2, 3 in a first step 100, such that a first side 2'a of the internal thread 2' is in contact with an opposing first side 3'a of the external thread 3' as illustrated in FIG. 3, wherein the two components are mutually rotated, which mutual rotation yields a mutual translational movement of the two threaded components 2, 3. The applied torque starts to be monitored when the torque is applied, shown as a second step 200, and continuous to be monitored during the following steps. The components are hereafter fixated with respect to each other in a third step 300, such that no mutual translational movement is allowed, whereas mutual rotation is still allowed. This may be accomplished by driving one of the components 2, 3 to an extreme position where the load is no longer resting on the nut 2, but instead on a stop at the extreme position. A torque is then withheld the components 2, 3 in a fourth step 400, until a second side 2'b of the internal thread 2' is in contact with an opposing second side 3'b of the external thread 3'b. This means until the load of the control rod is again resting on the nut 2. The applied torque is thus applied to the components 2, 3 during a time when no load is resting on one of the components 2, 3, if there is a play between the components 2, 3, and during this time the applied torque will be lower than if the load was resting on both the components 2,3. This can be seen as a withholding of the torque. The applied torque is monitored, as illustrated in FIG. 4 during the above steps in order to identify a first point in time $t_1$ when the first side of the internal tread 2' loses contact with the opposing first side of the external tread 3' and a second point in time $t_2$ when the second side of the internal tread 2' meets the opposing second side of external tread 3'. In the figure the torque is shown in relation to an angle rotation. If the velocity of the nut 3 in relation to the screw 2 is known and is constant, then it is possible to calculate the play (a) from the identified time period between $t_1$ and $t_2$ by using common motion law. The velocity may be derived from the rotational speed ω from a motor applying the torque to the components. From the identification of the first and second points in time a play (a) between the internal tread 2' and the external tread 3' is thus calculated in a fifth step 500, and in a sixth step 600 the play (a) is evaluated by comparing the play (a) with a reference play.

Information about the reference play may be gained from drawings of present assembly and its parts, or by operating a fault-free component to gain reference values. It is not only possible to determine how much the play (a) is deviating from a fault-free component, but also the remaining working life of the component.

According to one embodiment, the method according to the invention comprises monitoring the rotational movement of the two treaded components 2, 3, wherein the play (a) is calculated from the comparison of the torque and the rotational movement of the components 2, 3 over time. In FIG. 4 this is illustrated in a diagram where the monitored torque is compared with the rotational movement, here the angular rotation. The two points in time $t_1$ and $t_2$ are here identified, encircled for greater clarity. The first point in time $t_1$ can be determined from the torque, as when the components 2 and 3 are fixated with respect to each other, the torque will become zero. When the withheld torque then is applied to the components, the torque differs from zero as can be seen from the diagram in FIG. 4. The second point in time $t_2$ is derived from a change in torque distinguished by converting the torque into a step-function as will be further explained below. The two time points thus indicated endpoints in time for the play (a), and by e.g. measuring the angular rotation between the components 2, 3 by means of an angle rotation sensor, a rotation angle $f_i$ being the obtained rotational difference between the first point in time $t_1$ and the second point of time $t_2$, whereby the play (a) is determined by calculating $$a = f_i/360 \cdot G, \quad (1)$$

where G is the pitch of the threads of the components 2, 3. For example, if $f_i$ is determined to be 60° and the pith G is 6 mm/turn, the play (a) is 60/360·6=1 mm.

The applied torque may be determined directly or indirectly. According to one embodiment, the torque is obtained by using a torque sensor mounted between the motor/gear box and screw 3, and the torque is measured by measuring the load on the attachments of the motor or similar. According to a further embodiment, the torque is determined by measuring a motor current I and a motor voltage U of the motor applying the torque, and deriving the angular frequency ω and the torque from the measured signals. Thus, by constructing a composite signal of the motor current signal and the motor voltage signal, the frequency of naturally occurring irregularities can be observed and determined, which thus also is the angular frequency of the motor. As the power thus can be calculated as indicated below, the torque can be determined. According to another embodiment, the torque is measured indirectly by measuring the power input P to the motor and its angular frequency ω. If the motor is driven by electrical power, the input power P is determined by measuring current I and voltage U and calculated as indicated below:

$$P = U \cdot I \cdot \rightarrow P \quad (2)$$

$$P = T \cdot \omega \rightarrow T \quad (3)$$

This embodiment has the advantage that these parameters sometimes are already measured and available in a motor, and needs no extra equipment to be measured.

The angular frequency and phasing of the screw 3, or when applicable the nut 2, may be measured by an angular sensor mounted on the axis of the screw 3. The angular sensor may be mounted in the same unit as a torque sensor.

The invention is based on the fact that it is possible to follow very fast changes in the calculated torque, by measuring current I and voltage U to the electrical motor. The torque-signal comprises components that may be referred to the mechanical torque of the motor and to signal variations which arises at fast velocity changes in the magnetic circuit of the motor, e.g. when a bar or winding groove in the rotor passes a winding groove in the stator. The change of the rotational speed ω is almost proportional to the load.

The change in the torque-signal may be divided in separate categories:

Periodical signals that may be referred to the actual power frequency and its harmonics Periodical signals which may be referred to rotating parts of the machinery Other signal components With the aid of a notch filter, signals of the first type may be eliminated because they are not directly referred to the mechanical function of the machine, but depends on harmonics in the power distribution network, the magnetic characteristics of the machine etc. The other type of periodical signals may be referred to the rotating parts of the machinery and reflects the actual magnetic and mechanical symmetry and asymmetry of the electrical motor dependent of manufacturing accuracy and shaping, and bearings and engagement of teeth. Dependent on which parts that are interesting and uninteresting, respectively, from a diagnosis point of view, these may be eliminated with a notch filter. Especially variations in the magnetic design may result in a rich harmonic spectrum. The rest of the parts of the torque-signal may be derived from actual changes caused by factors outside the motor which influences its torque. It is in these parts of the torque signal the actual information about the components 2, 3 can be found.

The filtering process of the torque-signal may be made numerically in different ways and by a sequence of different actions. To eliminate unwanted periodical signals, Fourier transformation (FFT) is a standard procedure. When filtering aperiodic signals with varying amplitudes, "end-effects" may be obtained at transformation of a signal from the frequency domain to the time domain if some parts of the frequency domain are eliminated. Some of these effects may be damped by increasing the length of the data set.

The above described filtering process thus reduces the amplitude of the signals that are hiding the mechanical processes of the components 2, 3. Some information may thus be obtained in the signals that have been filtered away, and may be referred to other processes and interpreted. As a finishing part of the numerical treatment of the torque-signal (after filtering away periodical elements) a numerical adaptation of the torque-signal to a step-function is made, to be able to determine in time $t_2$ for the load change. In FIG. 4 the torque is illustrated as a step-function, and has thus undergone the above filtering procedures. It is thus possible to follow very small variations of the load in the torque, as it according to the invention is possible to distinguish these small variations from the surrounding noise.

According to one embodiment, the monitored torque is evaluated to determine damages of the components 2, 3, by comparing the time-dependent torque values with time-dependent torque values from a fault-free component. The ideal screw/nut combination is completely symmetric and is expected to have an even transference of the turning of the screw 3 to the position of the nut 2. In practice, the load distribution over the thread groove surface is uneven distributed dependent on the strain on the material, lubrication etc, but also on mechanical errors at the manufacturing. The finishing of the thread groove surface will also have an effect. The consequence of these errors brings about that the movement from the nut 2 on the screw 3 may show superimposed torque variations caused by that the nut 2 is not moving concentrically with the axis of the screw 3 and deviations appear. If friction between screw and nut is large it may arise torsional oscillations in the axis of the screw 3 caused by the change between static and dynamic friction. These torsional oscillations will be reflected as fluctuations in the momentary torque demand. The frequency of these fluctuations depends on the position of the nut 2 along the screw 3. By analysing these fluctuations and comparing the torque with a torque from a fault-free component, damages to the geometry of the contact surfaces of the component may be derived.

Motor operated screw 3 and nut 2 arrangements are sometimes equipped with torque limiting couplings to protect screw 3, motor and eventually the components that the arrangement moves. The torque trigger is often shaped such that if the torque overrides a certain value, the operating stops. It can technically be hard to measure this trigging torque without special tools and instruments and sometimes with demands of demounting. By determining the torque as described above, it is possible to test the actual trigging torque of the torque sensor, and its function in other respects.

Figure 6:
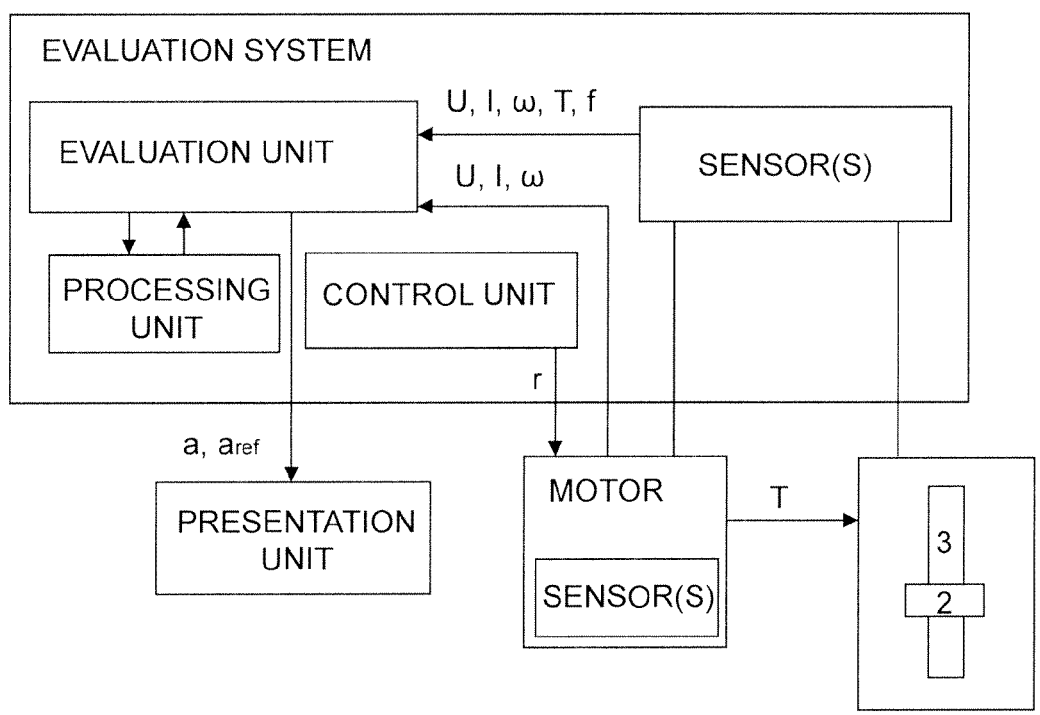
FIG. 6 shows a block diagram of one embodiment of the system according to the invention.

The invention also relates to an evaluation system for evaluating the play between two threaded components as shown in FIG. 6. The system comprises a control unit adapted to send control signals (r) to a motor applying a torque to the components, such that the method steps 300 and 400 are made. The evaluation system further comprises an evaluation unit adapted to monitor the torque applied to at least one of the components 2, 3 and a processing unit for processing means, wherein the evaluation unit further is adapted to from the monitored torque, identify a first point in time $t_1$ when the first side of the internal tread 2' loses contact with the opposing first side of the external tread 3' and a second point in time $t_2$ when the second side of the internal tread 2' meets the opposing second side of external tread 3'. The points in time may be derived after filtering of the torque signal as explained above, and when the torque has been transformed into a step-function. The evaluation unit is further adapted to calculate from the identification of the first and second points in time a play (a) between the internal tread 2' and the external tread 3'; and to evaluate the play (a) by comparing the calculated play (a) with a reference play. The processing unit aids the evaluation unit in all processing matter, and may comprise a CPU or other microprocessor. A memory for saving reference data, program data and other kinds of data may be incorporated in the processing unit and/or evaluation unit.

Prior to service, a control rod assembly can be tested by using the evaluation system and method before dismounting, and a diagnosis can be given. Hence it is possible to prepare the work before the service process is initiated. If found error free in the test, the assembly can be left unopened. This is an advantage, as the process of opening the assembly is a risk for creating new errors due to erroneous mounting, use of erroneous parts etc. irrespective if the assembly was free from errors when opened. The control rods which are not dismounted for service can of course be controlled using the system to see whether there is a need for service.

When remounted, the assembly can be controlled by using the invention and reduce the risk to have erroneous mounted control rod assemblies after the inspection procedure.

The evaluation unit is according to one embodiment adapted to monitor the rotational movement of the two treaded components 2, 3, to compare the torque and the rotational movement of the components 2, 3 over time, and calculate the play (a) from the comparison. The rotational movement may be measured by an angle rotation sensor and the evaluation unit is then preferably adapted to determining a rotation angle $f_i$ being the obtained rotational difference between the first point in time $t_1$ and the second point of time $t_2$, and to determine the play (a) by calculating equation (1).

The system may comprise a torque sensor for measuring the torque applied by a motor.

According to another embodiment, the system comprises sensors for measuring a motor current I and a motor voltage U of a motor applying the torque, whereby the evaluation unit is adapted to derive an angular frequency ω and the torque from the measured signals by using equations (2) and (3). According to another embodiment, the system further comprises a sensor for measuring an angular frequency ω of the motor applying the torque, whereby the evaluation unit is adapted to calculate a torque from the sensed signals by using equations (2) and (3). In the FIG. 6, it is shown that these signals already may be present measured by internal sensors in the motor, and no extra sensors are then needed. In the figure all sensors included in the system are schematically illustrated in a box, but it is to be understood that sensed signals for motor current I, motor voltage U, angular frequency ω, torque T and angular phase f may be transferred to the evaluation unit, as illustrated in the figure.

The evaluation of the play (a) may be presented on a presentation unit as shown in FIG. 6, and it is understood that other signals, relationships etc relating to the explained embodiments also may be presented on the presentation unit. The presentation unit is according to one embodiment a computer, but may be a mobile phone or any other kind of unit capable of presenting the described evaluation.

The evaluation unit is according to one embodiment adapted to evaluate the monitored torque T to determine damages of the components, by comparing monitored time-dependent torque values with time-dependent torque values from a fault-free component. Thus, other damages to the components may be determined apart from the deviation of the play.

The present invention also relates to a computer program product comprising computer program code means adapted to perform the steps of the method as explained above, when running on a processor included in the evaluation unit. The invention also comprises a computer program product comprises the computer code means, where the computer program code means are stored on a computer readable medium.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method of evaluating the play between two threaded components, a first component comprising an internal thread, and a second component comprising an external thread that corresponds to the internal thread of the first component, the components are engaged with each other, the method comprising the steps of:
applying a torque from a motor to said components such that a first side of the internal thread is in contact with an opposing first side of the external thread wherein the two components are mutually rotated, which mutual rotation yields a mutual translational movement of the two threaded components;
fixing the components with respect to each other, such that no mutual translational movement is allowed, whereas mutual rotation is still allowed;
withholding a torque to said components, until a second side of the internal thread reaches contact with an opposing second side of the external thread,
monitoring the applied torque during the above steps by determining the power input to the motor and the rotational speed of the motor in order to identify a first point in time $t_1$ when the first side of the internal thread loses contact with the opposing first side of the external thread and a second point in time $t_2$ when the second side of the internal thread meets the opposing second side of the external thread,
calculating from the identification of the first and second points in time a play (a) between the internal thread and the external thread
evaluating the play (a) by comparing the play (a) with a reference play.

2. Method according to claim 1, further comprising the step of monitoring the mutual rotational movement of the two threaded components, wherein the play (a) is calculated from the comparison of the torque and the mutual rotational movement of the components over time.

3. Method according to claim 2, comprising the step of determining said rotational movement by measuring an angle rotation between the components by means of an angle rotation sensor.

4. Method according to claim 3, comprising determining a rotation angle $f_i$ being the obtained rotational difference between said first point in time and said second point of time, whereby said play (a) is determined by calculating $a=f_i/360 \cdot G$, where G is the pitch of the threads of said components.

5. Method according to claim 1, wherein the step of monitoring the torque comprises measuring said torque applied by a motor by a torque sensor.

6. Method according to claim 1, wherein the step of monitoring the torque comprises measuring a motor current I and a motor voltage U of a motor applying said torque, and deriving an angular frequency $\omega$ and the torque from the measured signals.

7. Method according to claim 1, wherein the step of monitoring the torque comprises measuring a motor current I, a motor voltage U and an angular frequency $\omega$ of a motor applying said torque.

8. An evaluation system for evaluating the play between two threaded components, a first component comprising an internal thread, and a second component comprising an external thread that corresponds to the internal thread of the first component, the components are engaged with each other, the system comprises a control unit configured to send control signals (r) to a motor applying a torque to the components, such that
the components are first fixated with respect to each other, such that no mutual translational movement is allowed, and a first side of the internal thread is in contact with an opposing first side of the external thread wherein the two components are mutually rotated, which mutual rotation yields a mutual translation movement of the two threaded components;
a torque is withheld to said components, until a second side of the internal thread reaches contact with an opposing second side of the external thread;
the evaluation system further comprises an evaluation unit configured to monitor said torque applied to at least one of said components, said monitoring comprises determining the power input to the motor and the rotational speed of the motor and a processing unit, wherein the evaluation unit further is configured to
from the monitored torque, identify a first point in time $t_1$ when the first side of the internal thread loses contact with the opposing first side of the external thread and a second point in time $t_2$ when the second side of the internal thread meets the opposing second side of the external thread;
calculate from the identification of the first and second points in time a play (a) between the internal thread and the external thread; and to
evaluate the play (a) by comparing the calculated play (a) with a reference play.

9. Evaluation system according to claim 8, wherein the evaluation unit is configured to monitor the rotational movement of the two threaded components, to compare the torque and the rotational movement of the components over time, and to calculate the play (a) from the comparison.

10. Evaluation system according to claim 9, comprising an angle rotation sensor configured to measure a rotational movement between the components.

11. Evaluation system according to claim 10, wherein the evaluation unit is configured to determine a rotation angle $f_i$ being the obtained rotational difference between said first point in time and said second point of time, and to determine said play (a) by calculating $a=f_i/360 \cdot G$, where G is the pitch of the threads of said components.

12. Evaluation system according to claim 8, comprising a torque sensor configured to measure said torque applied by a motor.

13. Evaluation system according to claim 8, comprising sensors configured to measure a motor current I and a motor voltage U of a motor applying said torque, whereby the evaluation unit is configured to derive an angular frequency $\omega$ and the torque from the measured signals.

14. Evaluation system according to claim 8, comprising sensors configured to measure a motor current I, a motor voltage U and an angular frequency $\omega$ of a motor applying said torque, whereby the evaluation unit is adapted to calculate a torque from the sensed signals.

15. Evaluation system according to claim 8, wherein said components are a screw and nut in a control rod assembly.

16. A non-transitory computer readable medium storing computer program code for performing the steps of the method according to claim 1, when running on a processor associated with a control unit.

* * * * *